_United States Patent_ [19]

Duchesneau

[11] Patent Number: 4,934,901
[45] Date of Patent: Jun. 19, 1990

[54] PITCH CHANGE ACTUATION SYSTEM
[76] Inventor: Jerome G. Duchesneau, Pine Ridge Dr., Andover, Conn. 06232
[21] Appl. No.: 342,002
[22] Filed: Apr. 21, 1989
[51] Int. Cl.⁵ ............................................. B64C 11/06
[52] U.S. Cl. ....................................... 416/46; 415/129; 416/158; 416/160
[58] Field of Search .................... 416/46, 48, 153, 155, 416/158, 160; 415/129, 130

[56] References Cited
U.S. PATENT DOCUMENTS

| | | | |
|---|---|---|---|
| 2,666,490 | 1/1954 | Richmond | 416/155 X |
| 3,467,198 | 9/1969 | Ellinger | 416/157 R X |
| 3,687,569 | 8/1972 | Klompas | 416/160 X |
| 3,866,415 | 2/1975 | Ciokajlo | 416/46 X |
| 4,738,590 | 4/1988 | Butler | 416/129 |
| 4,738,591 | 4/1988 | Butler | 416/160 X |
| 4,810,164 | 3/1989 | Wright | 415/129 |

FOREIGN PATENT DOCUMENTS

| | | | |
|---|---|---|---|
| 491923 | 4/1953 | Canada | 416/46 |
| 1196588 | 7/1970 | United Kingdom | 416/48 |
| 1196589 | 7/1970 | United Kingdom | 416/48 |

Primary Examiner—Everette A. Powell, Jr.
Attorney, Agent, or Firm—Troxell K. Snyder

[57] ABSTRACT

A self-locking pitch change actuator is configured to fit within an annular hub (34). A ring gear (40) is driven circumferentially by a tangentially oriented ballscrew (42) and traveler (44). The ballscrew (42) is driven by a hydraulic motor (50) controlled responsive to an electric pitch change motor (74). A pitchlock (62) is positioned by the collective actions of the ballscrew (42) and pitch change motor (74), with any movement relative to a preselected null position driving the hydraulic motor beta control valve (60) into an operative position.

5 Claims, 3 Drawing Sheets

PITCH CHANGE ACTUATION SYSTEM

FIELD OF THE INVENTION

The present invention relates to a system for positioning the blades of a variable pitch propeller system.

BACKGROUND

Typical variable pitch aircraft propulsor systems include a plurality of propeller blades mounted for pitch adjusting movement about each blade's longitudinal axis to a rotating hub driven by the aircraft engine. U.S. Pat. No. 4,523,891 shows such a system wherein the pitch adjusting linkage and mechanism is disposed within the hub which is located at the axis of rotation of the propulsor.

Modern ultra-high bypass ducted fan engines also use variable pitch fan blades for achieving efficient performance over a variety of operating conditions. Such systems may include a forward or booster compressor disposed upstream of the ducted, variable pitch fan which results in an annular flow of engine working fluid being conducted axially past the propulsor, radially inward of the variable pitch fan blades. Such propulsors typically have an annular hub, disposed radially outward of the working fluid stream and supported relative to the engine shaft by a plurality of radial struts which are secured to a radially inner bearing, or the like. The annular hub portion supports the individual propulsor blades.

Variable pitch positioning systems according to the prior art which are disposed adjacent the engine shaft require mechanical links or other blade pitch adjusting structure to pass radially through the annular working fluid stream, possibly diminishing engine efficiency due to blocking of the working fluid flow. Other considerations in using an axially central pitch change system include the physical size of the mechanism which may constrain the engine design as well as the lack of serviceability of the radially inwardly disposed structure.

What is needed is a pitch change system which is adapted to fit within an annular hub disposed outside of an annular stream of working fluid.

SUMMARY OF THE INVENTION

According to the present invention, a mechanical system for selectively and simultaneously varying the angle of attack of a plurality of individual blades in a propulsor stage is provided. The pitch changing system of the present invention is further configured to fit within an annular propulsor hub having a relatively large inner diameter, such as may be employed, for example, in a modern ultra-high bypass ducted fan aircraft engine.

The pitch changing system according to the present invention includes a unison ring linked to each propulsor blade for collectively and simultaneously changing the pitch thereof responsive to circumferential movement of the unison ring. The ring is positioned by a linear actuator disposed within the rotating annular hub and oriented tangentially with respect thereto.

The system further includes a pitchlock for maintaining the current pitch orientation of the propulsor blades in the event of a hydraulic or electrical failure or of any mechanical failure of the pitch changing system downstream of the pitchlock. The pitchlock itself is movable between a pair of pitchlock stops and is positioned therebetween by the collective action of the commanded positional input, and the feedback position resulting from the linear actuator.

The linear actuator is itself controlled responsive to the position of the pitchlock relative to a preselected null position between the pitchlock stops. The position-responsive controller of the system according to the present invention drives the linear actuator so as to maintain the pitchlock at the null position. Thus, the positional input resulting from operation of the pitch change motor is, in effect, cancelled by an opposite positional input derived from the linear actuator and hence the propulsor blades. The relatively small pitch change motor in this way positions the plurality of propulsor blades.

Locking of the propulsor blades occurs upon failure of either the hydraulic or the electric motor. Without the balanced sum of positional inputs, the pitchlock is driven from the null position into contact with one of the pitchlock stops, holding the linear actuator and therefore the unison ring and propulsor blades at the last commanded position and against further movement.

Both these and other features and advantages of the system according to the present invention will be apparent to those skilled in the art upon review of the following specification and the appended claims and drawing figures.

DETAILED DESCRIPTION OF THE PREFERRED EMBODIMENT

Figure 1:
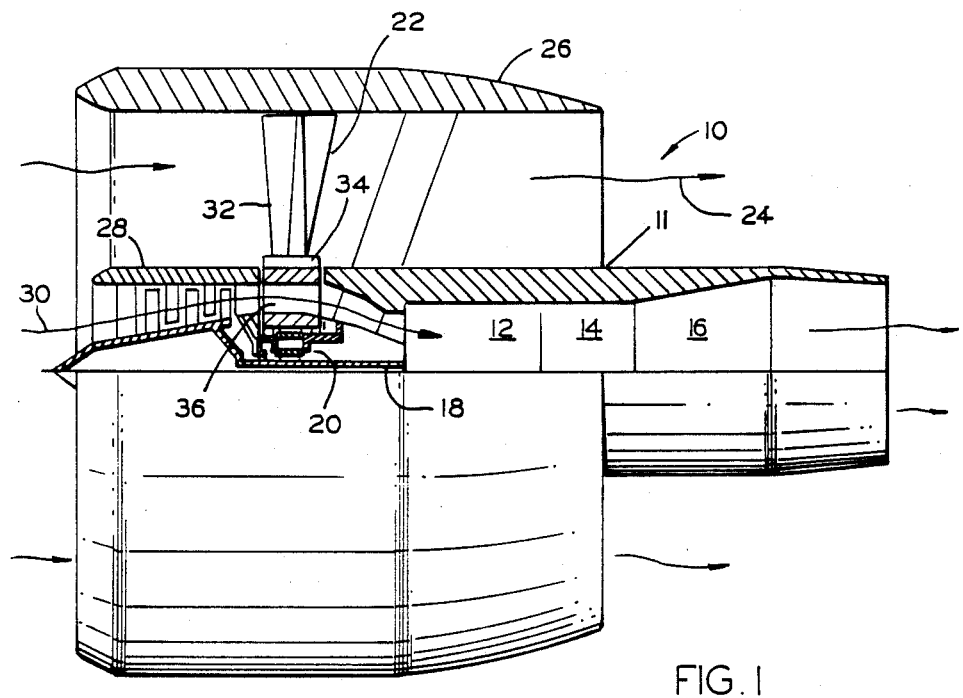
FIG. 1 shows a cross section of an ultra high bypass turbofan gas turbine engine.

FIG. 1 shows a schematic cross section of an ultra-high bypass gas turbine engine of the type in which the pitch change system according to the present invention is of particular advantage. The engine 10 includes an axial flow gas generator comprising a compressor section 12, a combustor section 14, and a turbine section 16. An output shaft 18, drives a gearbox 20 which in turn rotates a propulsor stage 22 which induces the bypass airflow 24 through the coaxial exterior shroud 26.

Such engines 10 may also include a forward booster compressor section 28 as also shown in FIG. 1 for pre-compressing the annular working fluid 30 which enters the gas generator compressor 12 after passing axially past the propulsor stage 22. As will be appreciated by those skilled in the art, the working fluid 30 must pass radially inward of the rotating propulsor blades 32 of the propulsor stage 22 and it is thus desirable to reduce any blockage or other propulsor structure crossing the annular working fluid flow path.

Figure 2:
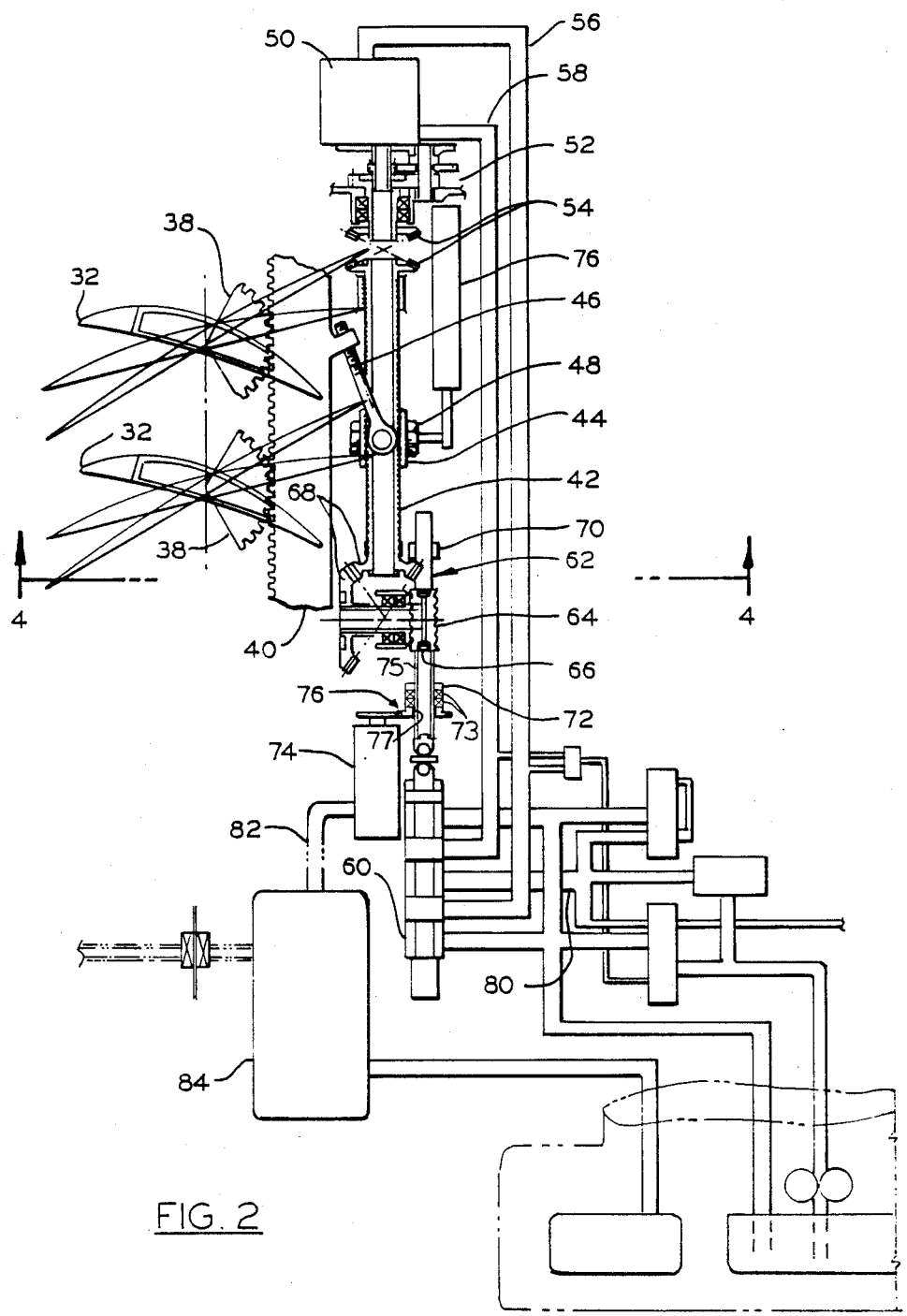
FIG. 2 shows a schematic representation of the components of the pitch change system according to the present invention.
Figure 3:
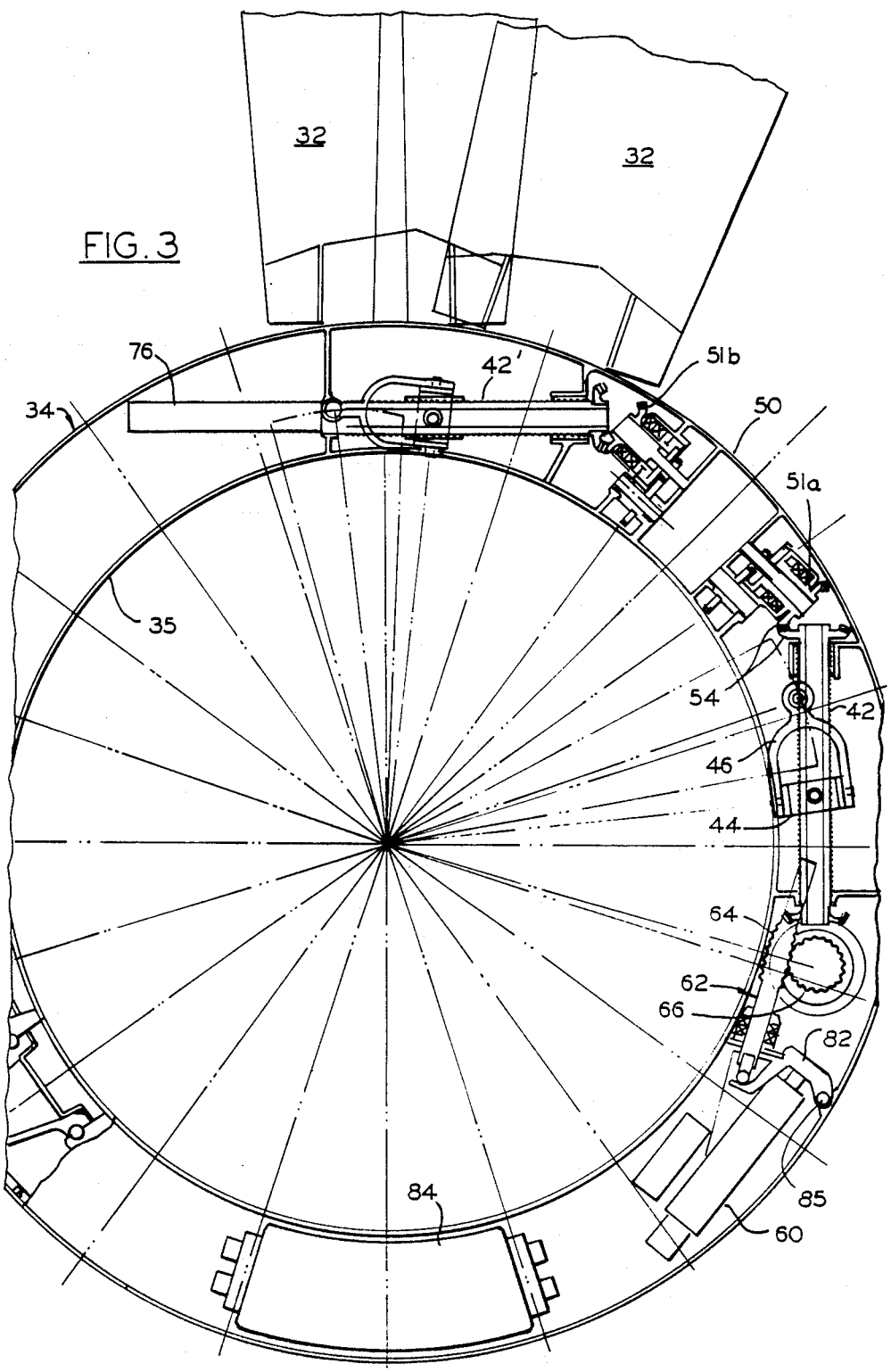
FIG. 3 shows a cross section of the annular hub taken in a radial plane and showing the pitch change system according to the present invention.

The pitch changing system according to the present invention is therefore disposed in the annular propulsor hub 34 which is located radially outward of the working fluid flow 30 at the base of the individual propulsor blades 32. The annular hub 34 thus has a relatively large inner diameter and is supported from the gearbox 20 by a plurality of generally radial supporting struts 36 as shown in FIG. 1. FIG. 3 shows a cross section of the hub 34 taken in the radial plane showing the location of various components of the pitch change system according to the present invention. FIG. 2 is a generally circumferential cross section of the hub and system which is best suited for an explanation of the interaction of the individual system components.

Referring now to FIG. 2, individual blades 32 are shown in cross section with corresponding sector gears 38 located at the radially inward span ends thereof. Sector gears 38 are intermeshed with a circumferential unison ring gear 40. Movement of the unison ring 40 drives the individual sector gears 38, collectively pivoting the propulsor blades 32 in order to provide the proper individual blade angle of attack for the current engine flow regime. The ring 40 is driven by a linear actuator oriented tangentially with respect to the ring 40 and, for the system according to the present invention, preferably a screw type actuator having a ballscrew 42 and a traveler 44 which is connected by means of a stirrup link 46 to the unison ring 40. Rotation of the ballscrew 42 moves the traveler 44 tangentially with respect to the ring 40 which is driven circumferentially by the pivotally mounted stirrup 46.

A hydraulic motor 50 drives the ballscrew 42 by means of a reduction gear box 52 and engaged bevel gears 54. The motor 50 turns in response to hydraulic fluid flow received via conduits 56, 58. The hydraulic motor 50 is a lightweight design delivering relatively low torque at high speed, developing the required force to move the unison ring 40 as a result of the mechanical advantage provided by the reduction gear box 52 and the ballscrew 42. Hydraulic fluid is dispatched to the hydraulic motor 50 by a control valve 60 as will be more fully disclosed hereinbelow.

A major feature of the pitch change system according to the present invention is the provision for locking the individual propulsor blades 32 in their current position should any one of the pitch change system components fail. Such locking is desirable to avoid a potentially dangerous shift in the angle of attack of the individual blades as a result of such failure. Blade locking is accomplished in the system according to the present invention by means of a pitchlock 62 which includes a wormscrew 64 engaged with a worm gear 66, which is in turn engaged with the ballscrew 42 by means of matching bevel gears 68. The pitchlock 62 may move longitudinally only between first and second pitch stops 70, 72 thereby restraining rotation of the ballscrew 42 and hence movement of the unison ring 40 and blades 32.

Pitchlock 62 receives a second positional input by means of the pitch change motor 74 which rotates the pitchlock 62 and worm screw 64 by means of intermeshing gears 76. The pitchlock 62 includes an external spline 75 which is slidably received within a corresponding internally splined gear 77. The internally splined gear is supported by bearings 73 thus rotating the pitchlock 62 and wormscrew 64 without restraining longitudinal movement of the pitchlock 62. The location of the pitchlock 62 between the pitchlock stops 70, 72 is thus the result of the combined effect of the first positional input derived from the ballscrew 42 and the second positional input derived from the pitch change motor 74.

Pitchlock 62 abuts the hydraulic control valve 60 which controls the flow of hydraulic fluid to the hydraulic motor 50 via conduits 56, 58. The control valve 60, also termed a "beta valve" directs hydraulic fluid to the motor 50 in response to any displacement of the pitchlock 62 from a null position intermediate the pitchlock stops 70, 72. Hence, the hydraulic motor 50 is controlled by the valve 60 so as to rotate the ballscrew 42 as necessary to position the pitchlock 62 at the selected null location.

The operation of the pitch change system according to the present invention should now be apparent. During steady state operation, the control valve 60 provides hydraulic fluid to the hydraulic motor 50 so as to maintain the pitchlock 62 at the null position. Hence, ballscrew 42, traveler 44, and unison ring 40 are also held thereby maintaining the angle of attack of the individual blades 32. The actual pitch of the blades 32 may be measured by the aircraft operator by means of a feedback transducer 76 secured to the traveler 44.

At times when the aircraft operator desires to change the collective pitch of the blades 32, movement of the pitch change motor 74 is initiated, rotating the pitchlock 62 and providing a second positional input which attempts to drive the pitchlock 62 toward one or the other of the stops 70, 72. Such motion is detected by the control valve 60 which in turn drives the hydraulic motor 50 so as to rotate the ballscrew 44 and worm gear 66 to maintain the pitchlock 62 at the null location. Pitch change motor 74 is a lightweight, low power motor, being required only to rotate the pitchlock 62 and worm screw 64. All of the work done in holding and changing the pitch of blades 32 is performed by the hydraulic motor 50 at the direction of the control valve 60. Control valve 60 receives a supply of pressurized hydraulic fluid 80 from the airframe via any of a variety of means well known in the art for supplying hydraulic fluid to a rotating component. Likewise, the pitch change motor 74 receives electric power from the nonrotating engine or aircraft structure via conductors 82.

Should any one of the motors or other control components fail, it will be apparent that the system according to the present invention will "lock up" the ballscrew 42 and unison ring 40 thereby maintaining the current position of the individual propulsor blades 32. By way of example, a loss of hydraulic pressure in the supply conduit 80 could allow hydraulic motor 50 to be rotated backward by the force of the unison ring 40 on the traveler 44 and ballscrew 42. Without a corresponding movement of the pitch change motor 74 as induced by the control module 84, the pitchlock 62 is merely driven into either the first or second pitchlock stops 70, 72 thereby arresting further motion of the ballscrew 42. Likewise, a failure of the pitch change motor 74 or control module 84 would result in a fixed blade pitch.

Referring to FIG. 3, the arrangement of the individual components within the annular hub 34 is illustrated. Pitch change motor 50 is disposed within the annular hub 34 and includes two output shafts 51a and 51b driving corresponding ballscrews 42, 42'. As may be appreciated by viewing the layout of FIG. 3, the ballscrew, traveler and stirrup portions of the system according to the present invention are preferably symmetrically disposed about the hydraulic motor 50 for reducing the maximum force imposed on any single component as well as for achieving a balanced weight distribution about the periphery of the hub 34.

The embodiment in FIG. 3 also includes a diametrically opposite symmetric arrangement of the system according to the present invention which is not shown for the sake of clarity.

The ballscrew 42, motor shaft 51a, 51b, and pitchlock 62 are each oriented tangentially with respect to the annular hub 34 and each lie within the hub. The meshing of the bevel gears 54 at the hydraulic motor shaft 51a is illustrated in FIG. 3 as is the meshing of the worm screw 64 and worm gear 66. The control valve 60 is moved responsive to displacement of the pitchlock 62 by means of a bent lever 82 pivotally mounted 85 to the annular hub 34 as shown in FIG. 3.

As noted previously, annular hub 34 has a large inner diameter 35 so as to accommodate not only the annular flow of working fluid entering the gas generator 11, but any additional structure such as a gear box 20, etc. The feedback transducer 76 shown schematically as being associated with the first ballscrew 42 may equivalently be secured to the second ballscrew 42' as shown. It is also within the scope of the present invention to provide additional hydraulic motors, gearboxes and ballscrew assemblies as shown in FIG. 3 so as to further balance and distribute the workload and force between the individual components and to maintain a radial small profile. The use of several actuator assemblies 42, 44, 46 and hydraulic motors 50 distributed about the periphery of the annular hub 34 provides the advantages, noted above, of reducing the physical size and weight of the individual components as well as assisting in maintaining the rotational balance of the propulsor assembly and fit in the desired space.

Figure 4:
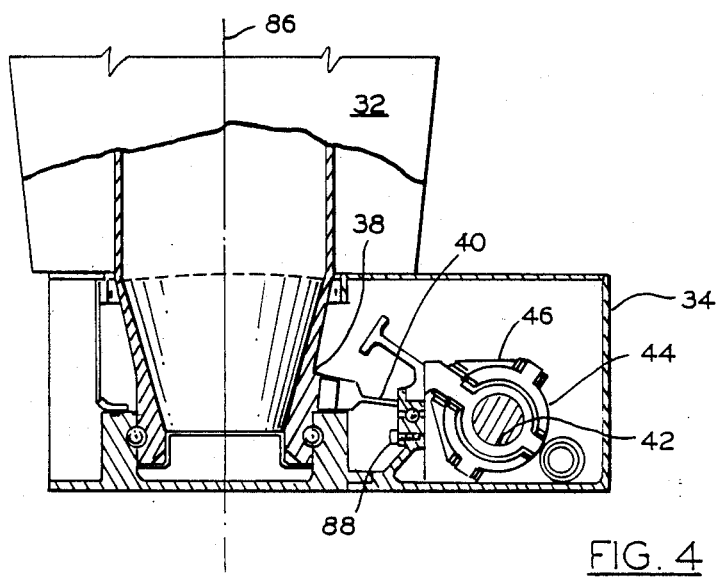
FIG. 4 shows a cross section of the annular hub taken in an axial plane as indicated in FIG. 2.

FIG. 4 shows the indicated cross section of the annular hub. Each individual blade 32 is mounted for rotation about the longitudinal axis 86 thereof and includes a sector gear 38 as shown in FIG. 2. The unison ring 40 is supported relative to the hub 34 by a bearing 88 and is thus free to move circumferentially under the influence of the movement of the traveler 44 via stirrup link 46.

It is thus apparent that the system according to the present invention is well suited for providing a fail safe pitch change system within the particular geometric constraints of an annular hub such as may be used in a ultra-high bypass ducted fan gas turbine engine, or the like. It will further be apparent that the present invention, although disclosed in terms of the particular arrangement and components described hereinabove, may equivalently be achieved using a variety of other arrangements and components. The preceding discussion, therefore, is thus merely illustrative, with the scope of the present invention defined solely by the claims appended hereinbelow.

I claim:

1. System for selectively adjusting the blade pitch of a multiple blade propulsor having an annular rotating hub, comprising:
   a unison ring disposed within the annular hub and mechanically linked to each blade of the propulsor;
   a linear actuator, mounted within the annular hub and oriented tangentially with respect thereto;
   means, linking the unison ring and linear actuator, for imparting circumferential motion to the unison ring;
   a pitchlock, movable between a first pitchlock stop and a second pitchlock stop, and further movable responsive to a collective positional input including
   a first positional input derived from the position of the linear actuator, and
   a second positional input derived from a pitch change actuator, said pitch change actuator selectively movable responsive to a pitch control signal; and
   means, responsive to any movement of the pitchlock relative to a null position located intermediate the first and second pitchlock stops, for positioning the linear actuator.

2. The system as recited in claim 1, wherein the linear actuator comprises:
   a ballscrew oriented tangentially with respect to the annular hub and driven by an hydraulic motor, and
   a traveler, driven linearly by rotation of the ballscrew.

3. The system as recited in claim 1 wherein the pitchlock comprises:
   a worm screw longitudinally extending tangentially with respect to the annular hub and longitudinally movable between the first and second pitchlock stops, and wherein
   the first positional input is a worm gear engaged therewith, said worm gear driven rotationally by rotation of the ballscrew, and wherein
   the second positional input is a pinion gear engaged with a corresponding circumferential gear on the worm screw, said pinion gear driven rotationally by the pitch change actuator.

4. The system as recited in claim 3 wherein the pitch change actuator is a control motor.

5. The system as recited in claim 2 wherein the positioning means includes
   means, disposed between the reversible hydraulic motor and a source of hydraulic fluid for selectively rotating the hydraulic motor and ballscrew for maintaining the pitchlock in the null position.

* * * * *